United States Patent
Hsieh et al.

(10) Patent No.: US 10,430,288 B2
(45) Date of Patent: Oct. 1, 2019

(54) DATA BACKUP METHOD, DATA RECOVERY METHOD AND STORAGE CONTROLLER

(71) Applicant: SHENZHEN EPOSTAR ELECTRONICS LIMITED CO., Shenzhen OT (CN)

(72) Inventors: Hung-Chih Hsieh, Hsinchu County (TW); Hao-Cing Jhou, New Taipei (TW); Yu-Hua Hsiao, Hsinchu County (TW)

(73) Assignee: SHENZHEN EPOSTAR ELECTRONICS LIMITED CO., Shenzhen (CN)

( * ) Notice: Subject to any disclaimer, the term of this patent is extended or adjusted under 35 U.S.C. 154(b) by 0 days.

(21) Appl. No.: 15/790,049

(22) Filed: Oct. 22, 2017

(65) Prior Publication Data
US 2019/0026027 A1 Jan. 24, 2019

(30) Foreign Application Priority Data
Jul. 24, 2017 (TW) .............................. 106124699 A

(51) Int. Cl.
G06F 11/14 (2006.01)
G06F 3/06 (2006.01)

(52) U.S. Cl.
CPC ........ G06F 11/1458 (2013.01); G06F 3/0619 (2013.01); G06F 3/0629 (2013.01);
(Continued)

(58) Field of Classification Search
CPC ... G06F 11/1446–1474; G06F 2212/72; G06F 2212/7211; G06F 12/024; G06F 2212/7207; G06F 12/0246; G11C 16/3495
See application file for complete search history.

(56) References Cited

U.S. PATENT DOCUMENTS 8,762,661 B2 * 6/2014 Ng .................... G06F 3/0617
711/154
9,009,396 B2 * 4/2015 Nemazie ............ G06F 12/0246
711/103
(Continued)

FOREIGN PATENT DOCUMENTS

TW    I563509    12/2016
TW    I570560    2/2017

OTHER PUBLICATIONS

"Office Action of Taiwan Counterpart Application," dated Oct. 20, 2017, p. 1-p. 3, in which the listed references were cited.

*Primary Examiner* — Reginald G Bragdon
*Assistant Examiner* — Curtis James Kortman
(74) *Attorney, Agent, or Firm* — JCIPRNET

(57) ABSTRACT

A data backup method and a data recovery method are provided. The data backup method includes: updating a main information table and a sub information table and generating physical unit information according to an erase count and a physical unit status of a physical unit; writing the physical unit information into the physical unit before writing data into the empty physical unit; writing the main information table and the sub information table into a rewritable non-volatile memory module according to corresponding conditions. The data recovery method includes: writing a latest main information table stored in a rewritable non-volatile memory module into a memory; updating the main information table in the memory according to a sub information table which is newer than the main information table; and updating the main information table in the memory according to physical unit information which is newer than the sub information table.

10 Claims, 7 Drawing Sheets

(52) U.S. Cl.
CPC ........ *G06F 3/0679* (2013.01); *G06F 11/1471* (2013.01); *G06F 2201/835* (2013.01); *G06F 2212/7207* (2013.01); *G06F 2212/7211* (2013.01)

(56) References Cited

U.S. PATENT DOCUMENTS

| | | | |
|---|---|---|---|
| 9,268,646 B1* | 2/2016 | Chiu | G06F 3/0619 |
| 2009/0168525 A1* | 7/2009 | Olbrich | G06F 13/1657 |
| | | | 365/185.11 |
| 2014/0101371 A1* | 4/2014 | Nguyen | G06F 3/0616 |
| | | | 711/103 |
| 2017/0010961 A1* | 1/2017 | Tan | G06F 12/0246 |

* cited by examiner

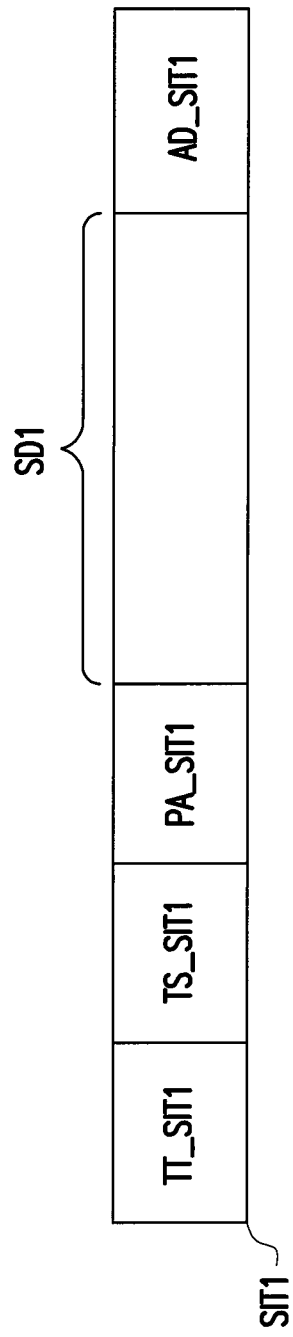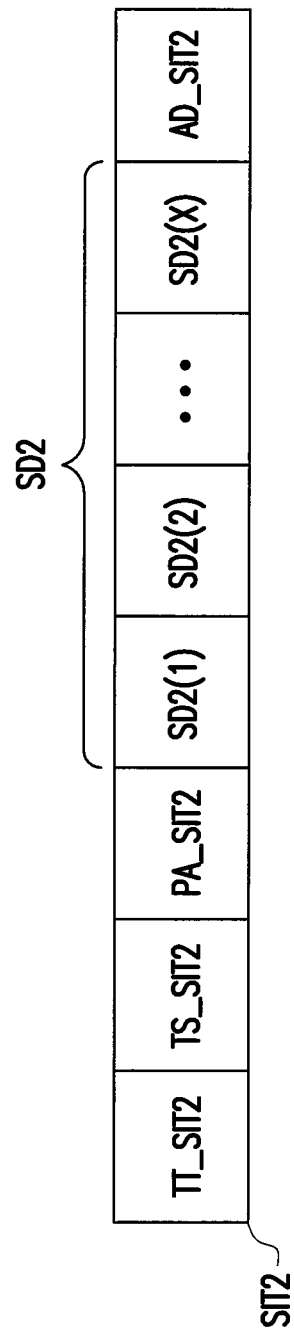

DATA BACKUP METHOD, DATA RECOVERY METHOD AND STORAGE CONTROLLER

CROSS-REFERENCE TO RELATED APPLICATION

This application claims the priority benefit of Taiwan application serial no. 106124699, filed on Jul. 24, 2017. The entirety of the above-mentioned patent application is hereby incorporated by reference herein and made a part of this specification.

BACKGROUND OF THE INVENTION

Field of the Invention

The invention relates to a data backup method and a data recovery method and particularly relates to a data backup method, a data recovery method, and a storage controller adapted for a storage device having a rewritable non-volatile memory module.

Description of Related Art

In general, when the status of one of the physical units of the rewritable non-volatile memory module is changed, the storage controller of the storage device (e.g., a solid state drive (SSD)) having the rewritable non-volatile memory module will record the new status of this physical unit to a physical unit information list table to update the physical unit information list table, and write the updated physical unit information list table to the rewritable non-volatile memory module.

Thereby, particularly in the data recovery operation after a sudden power failure event, the storage controller may perform the corresponding management operation according to the statuses of the physical units recorded in the physical unit information list table that has been written.

However, in the conventional technique described above, in order to record the new statuses of a few physical units, the storage controller is required to write the physical unit information list table corresponding to the statuses of all the physical units of the rewritable non-volatile memory module, which not only consumes a lot of space/time/resources to write unchanged information in the physical unit information list but also increases wear of the rewritable non-volatile memory module, thereby reducing the overall system performance and reducing the service life of the rewritable non-volatile memory module.

Thus, how to more efficiently manage and maintain the status information of the physical units and at the same time keep the data recovery operation efficient to improve the performance and safety of the storage device provided with the rewritable non-volatile memory module is an issue that needs to be addressed in this field.

SUMMARY OF THE INVENTION

The invention provides a data backup method, a data recovery method, and a storage controller adapted for efficiently backing up statuses of physical units of a rewritable non-volatile memory module by using different types of information tables and physical unit information stored in the physical units, so as to perform a corresponding data recovery operation when a specific event occurs.

In an embodiment of the invention, a data backup method is provided, which is adapted for a storage device including a rewritable non-volatile memory module, wherein the rewritable non-volatile memory module includes a plurality of physical units. The data backup method includes: when allocating a first physical unit for executing a first writing operation among the physical units, setting a first physical unit status corresponding to the first physical unit according to the first writing operation; updating first main data corresponding to the first physical unit in a main information table in a memory according to the first physical unit status and a first erase count of the first physical unit, and generating and adding first sub data corresponding to the first physical unit to a sub information table in the memory to update the sub information table, wherein the sub information table includes a timestamp corresponding to the sub information table, an allocate array, and one or more sub data respectively corresponding to one or more physical units, wherein the one or more sub data records an index code, an erase count, and a physical unit status of the corresponding physical unit; if the first physical unit status of the first physical unit is an empty status and execution of the first writing operation is started, sequentially writing first physical unit information and first writing data corresponding to the first physical unit to the first physical unit; when a total number of the one or more sub data added to the sub information table that has been updated is equal to a first predetermined value, writing the sub information table that has been updated in the memory to the rewritable non-volatile memory module, resetting the sub information table in the memory, and accumulating a count; and when the count that has been accumulated is equal to a second predetermined value, writing the main information table that has been updated in the memory to the rewritable non-volatile memory module and setting the count to 0.

In an embodiment of the invention, a data recovery method is provided, which is adapted for a storage device including a rewritable non-volatile memory module, wherein the rewritable non-volatile memory module includes a plurality of physical units. The data recovery method includes: reading a main information table that is newest from the rewritable non-volatile memory module in response to a specific event that has occurred, and writing the main information table to a memory, wherein the main information table includes a timestamp corresponding to the main information table and a plurality of main data respectively corresponding to the physical units, wherein each of the plurality of main data records an erase count and a physical unit status of the corresponding physical unit; identifying one or more sub information tables stored in the rewritable non-volatile memory module, wherein each of the one or more sub information tables includes a timestamp corresponding to the sub information table, an allocate array, and one or more sub data respectively corresponding to one or more physical units, wherein the one or more sub data records an index code, an erase count, and a physical unit status of the corresponding physical unit; selecting a first sub information table from the one or more sub information tables, and updating the main information table in the memory according to the first sub information table, wherein a timestamp of the first sub information table is larger than the timestamp of the main information table; identifying a second sub information table that is newest among the one or more sub information tables, and identifying a plurality of first physical units according to an allocate array of the second sub information table; and updating the main information table in the memory according to a plurality of first physical unit information respectively stored in the first physical units.

In an embodiment of the invention, a storage controller is provided, which is adapted to control a storage device including a rewritable non-volatile memory module. The storage controller includes a memory interface control circuit and a processor. The memory interface control circuit is coupled to the rewritable non-volatile memory module, wherein the rewritable non-volatile memory module includes a plurality of physical units. The processor is coupled to the memory interface control circuit and a memory. When allocating a first physical unit for executing a first writing operation among the physical units, the processor is configured to set a first physical unit status corresponding to the first physical unit according to the first writing operation. The processor is further configured to update first main data corresponding to the first physical unit in a main information table in the memory according to the first physical unit status and a first erase count of the first physical unit, and generate and add first sub data corresponding to the first physical unit to a sub information table in the memory to update the sub information table, wherein the sub information table includes a timestamp corresponding to the sub information table, an allocate array, and one or more sub data respectively corresponding to one or more physical units, wherein the one or more sub data records an index code, an erase count, and a physical unit status of the corresponding physical unit. If the first physical unit status of the first physical unit is an empty status and execution of the first writing operation is started, the processor is further configured to sequentially write first physical unit information and first writing data corresponding to the first physical unit to the first physical unit. When a total number of the one or more sub data added to the sub information table that has been updated is equal to a first predetermined value, the processor is further configured to write the sub information table that has been updated in the memory to the rewritable non-volatile memory module, reset the sub information table in the memory, and accumulate a count. When the count that has been accumulated is equal to a second predetermined value, the processor is further configured to write the main information table that has been updated in the memory to the rewritable non-volatile memory module and set the count to 0.

In an embodiment of the invention, a storage controller is provided, which is adapted to control a storage device including a rewritable non-volatile memory module. The storage controller includes a memory interface control circuit and a processor. The memory interface control circuit is coupled to the rewritable non-volatile memory module, wherein the rewritable non-volatile memory module includes a plurality of physical units. The processor is coupled to the memory interface control circuit and a memory. The processor is configured to read a main information table that is newest from the rewritable non-volatile memory module in response to a specific event that has occurred, and write the main information table to a memory, wherein the main information table includes a timestamp corresponding to the main information table and a plurality of main data respectively corresponding to the physical units, wherein each of the plurality of main data records an erase count and a physical unit status of the corresponding physical unit, wherein the processor is further configured to identify one or more sub information tables stored in the rewritable non-volatile memory module, wherein each of the one or more sub information tables includes a timestamp corresponding to the sub information table, an allocate array, and one or more sub data respectively corresponding to one or more physical units, wherein the one or more sub data records an index code, an erase count, and a physical unit status of the corresponding physical unit, wherein the processor is further configured to select a first sub information table from the one or more sub information tables, and update the main information table in the memory according to the first sub information table, wherein a timestamp of the first sub information table is larger than the timestamp of the main information table, wherein the processor is further configured to identify a second sub information table that is newest among the one or more sub information tables, and identify a plurality of first physical units according to an allocate array of the second sub information table, wherein the processor is further configured to update the main information table in the memory according to a plurality of first physical unit information respectively stored in the first physical units.

Based on the above, in the data backup method, the data recovery method, and the storage controller provided in the embodiments of the invention, when one physical unit is written for the first time, the corresponding physical unit information would be recorded to the physical unit, and the physical unit status and the erase count corresponding to the physical unit in the changed status are recorded to the sub information table; and when a certain number of sub information tables are written to the rewritable non-volatile memory module, the main information table for recording main data of all the physical units of the rewritable non-volatile memory module is written to the rewritable non-volatile memory module, so as to record the physical units having changed statuses separately. Accordingly, the system is able to record/back up the physical unit statuses that have been changed with use of fewer resources, improve the smoothness of the writing operation and the service life of the rewritable non-volatile memory module, and thereby increase the working efficiency. In addition, in the data backup method, the data recovery method, and the storage controller provided in the embodiments of the invention, different types of physical unit information, sub information tables, and main information tables are stored at different time points, such that when the data backup method is performed with use of less resources, the main information table and the physical unit status information corresponding to all the physical units of the rewritable non-volatile memory module therein may be recovered efficiently and safely.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 5A is a schematic diagram showing the data structure of the initial sub information table according to an embodiment of the invention.

FIG. 5B is a schematic diagram showing the data structure of the sub information table according to an embodiment of the invention.

DESCRIPTION OF THE EMBODIMENTS

In this embodiment, a storage device includes a rewritable non-volatile memory module and a storage device controller (also referred to as storage controller or storage control circuit). The storage device is used together with a host system, such that the host system is capable of writing data to or reading data from the storage device.

Figure 1:
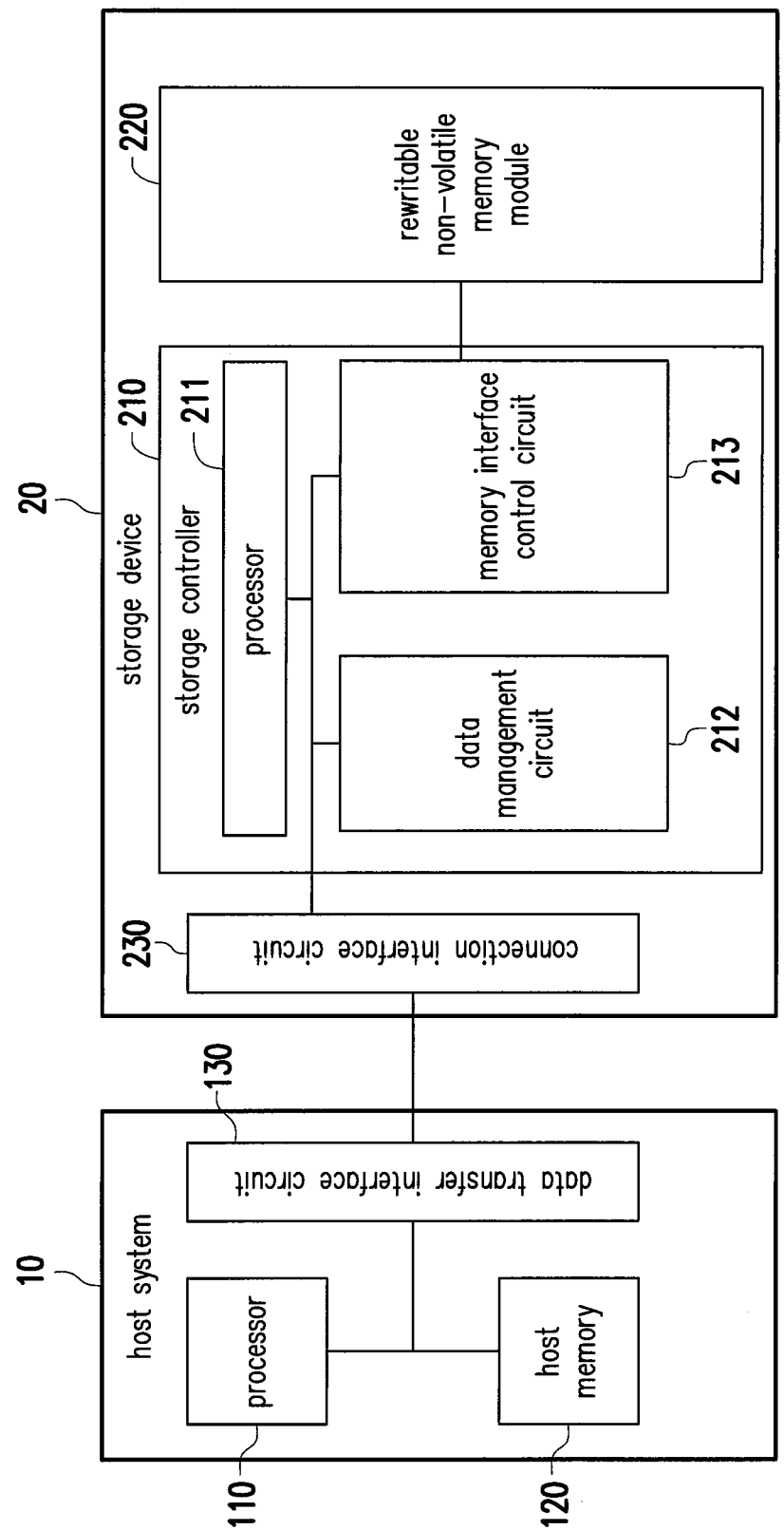
FIG. 1 is a block diagram of the host system and the storage device according to an embodiment of the invention.

FIG. 1 is a block diagram of the host system and the storage device according to an embodiment of the invention.

Referring to FIG. 1, the host system 10 includes a processor 110, a host memory 120, and a data transfer interface circuit 130. In this embodiment, the data transfer interface circuit 130 is coupled (also referred to as electrically connected) to the processor 110 and the host memory 120. In another embodiment, the processor 110, the host memory 120, the data transfer interface circuit 130 are coupled to one another via a system bus.

The storage device 20 includes a storage controller 210, a rewritable non-volatile memory module 220, and a connection interface circuit 230. The storage controller 210 includes a processor 211, a data transfer management circuit 212, and a memory interface control circuit 213.

In this embodiment, the host system 10 is coupled to the storage device 20 via the data transfer interface circuit 130 and the connection interface circuit 230 of the storage device 20 to access data. For example, the host system 10 may store data to or read data from the storage device 20 via the data transfer interface circuit 130.

In this embodiment, the processor 110, the host memory 120, and the data transfer interface circuit 130 may be disposed on a motherboard of the host system 10. One or more data transfer interface circuits 130 may be disposed. Via the data transfer interface circuit 130, the motherboard may be coupled to the storage device 20 in a wired or wireless manner. The storage device 20 may be a flash drive, a memory card, a solid state drive (SSD), or a wireless memory storage device, for example. The wireless memory storage device may be a memory storage device based on a variety of wireless communication technologies, such as a near field communication (NFC) memory storage device, a wireless fidelity (WiFi) memory storage device, a Bluetooth memory storage device or a Bluetooth low energy memory storage device (e.g., iBeacon), and so on. In addition, the motherboard may be coupled to an I/O device of any type, such as a global positioning system (GPS) module, a network interface card, a wireless transfer device, a keyboard, a monitor, a speaker, and so on, via the system bus.

In this embodiment, the data transfer interface circuit 130 and the connection interface circuit 230 are interface circuits compatible with the Peripheral Component Interconnect Express (PCI Express) standard. Moreover, data transfer between the data transfer interface circuit 130 and the connection interface circuit 230 is achieved by the Non-Volatile Memory express (NVMe) communication protocol.

However, it should be understood that the invention is not limited thereto, and the data transfer interface circuit 130 and the connection interface circuit 230 may also comply with the Parallel Advanced Technology Attachment (PATA) standard, the Institute of Electrical and Electronic Engineers (IEEE) 1394 standard, the Serial Advanced Technology Attachment (SATA) standard, the Universal Serial Bus (USB) standard, the Secure Digital (SD) interface standard, the Ultra High Speed-I (UHS-I) interface standard, the Ultra High Speed-II (UHS-II) interface standard, the Memory Stick (MS) interface standard, the Multi-Chip Package (MCP) interface standard, the Multi Media Card (MMC) interface standard, the Embedded Multimedia Card (eMMC) interface standard, the Universal Flash Storage (UFS) interface standard, the eMCP interface standard, the Compact Flash (CF) interface standard, the Integrated Device Electronics (IDE) interface standard, or other suitable standards. Besides, in another embodiment, the connection interface circuit 230 may be packaged with the storage controller 210 in a chip, or the connection interface circuit 230 may be disposed outside a chip that includes the storage controller 210.

In this embodiment, the host memory 120 is configured to temporarily store a command or data executed by the processor 110. For example, in this exemplary embodiment, the host memory 120 may be a dynamic random access memory (DRAM), a static random access memory (SRAM), and so on. However, it should be understood that the invention is not limited thereto, and the host memory 120 may also be other suitable memories.

The storage controller 210 is configured to execute a plurality of logic gates or control commands implemented in a hardware form or a firmware form, and perform operations, such as data writing, data reading, and data erasing, in the rewritable non-volatile memory module 220 according to the command of the host system 10.

To be more specific, the processor 211 in the storage controller 210 is hardware with computing capability and is configured to control the overall operation of the storage controller 210. More specifically, the processor 211 has a plurality of control commands, and when the storage device 20 is in operation, the control commands are executed for performing operations, such as data writing, reading, and erasing.

It should be noted that, in this embodiment, the processor 110 and the processor 211 are respectively a central processing unit (CPU), a micro-processor, other programmable processors, a digital signal processor (DSP), a programmable controller, an application specific integrated circuit (ASIC), a programmable logic device (PLD), or other similar circuit components, for example, but the invention is not limited thereto.

In an embodiment, the storage controller 210 further includes a read only memory (not shown) and a random access memory (not shown). In particular, the read only memory has a boot code. When the storage controller 210 is enabled, the boot code is first executed by the processor 211

(also referred to as execution of a boot up procedure or an initialization/formatting procedure) for loading the control commands stored in the rewritable non-volatile memory module 220 to the random access memory of the storage controller 210. Afterwards, the processor 211 executes the control commands to perform operations, such as data writing, reading, and erasing. According to another embodiment, the control commands of the processor 211 may also be stored in a specific region (e.g., a physical storage unit in the rewritable non-volatile memory module 220 exclusively used for storing system data) of the rewritable non-volatile memory module 220 in the form of program codes.

In this embodiment, as described above, the storage controller 210 further includes the data transfer management circuit 212 and the memory interface control circuit 213. It should be noted that the operation executed by each component of the storage controller 220 may be deemed as the operation executed by the storage controller 220.

The data transfer management circuit 212 is coupled to the processor 211, the memory interface control circuit 213, and the connection interface circuit 230. The data transfer management circuit 212 is configured to receive an instruction from the processor 211 for performing data transfer. For example, data is read from the host system 10 (e.g., the host memory 120) via the connection interface circuit 230, and the read data is written to the rewritable non-volatile memory module 220 via the memory interface control circuit 213 (for example, a writing operation is performed according to a writing command from the host system 10). For example, data is read from one or more physical units of the rewritable non-volatile memory module 220 via the memory interface control circuit 213, and the read data is written to the host system 10 (e.g., the host memory 120) via the connection interface circuit 230 (for example, a reading operation is performed according to a reading command from the host system 10). In another embodiment, the data transfer management circuit 212 may be integrated into the processor 211.

The memory interface control circuit 213 is configured to receive the instruction of the processor 211 and cooperate with the data transfer management circuit 212 to perform a writing (also referred to as programming), reading, or erasing operation on the rewritable non-volatile memory module 220.

For example, the processor 211 may execute a writing command sequence to instruct the memory interface control circuit 213 to write data to the physical unit of the rewritable non-volatile memory module 220; the processor 211 may execute a reading command sequence to instruct the memory interface control circuit 213 to read data from one or more physical units of the rewritable non-volatile memory module 220 corresponding to the reading command; and the processor 211 may execute an erasing command sequence to instruct the memory interface control circuit 213 to perform an erasing command sequence on the rewritable non-volatile memory module 220. The writing command sequence, the reading command sequence, and the erasing command sequence may respectively include one or more program codes or command codes and be used to instruct to execute the corresponding operation, such as writing, reading, and erasing, on the rewritable non-volatile memory module 220. In an embodiment, the processor 211 may also give other types of command sequences to the memory interface control circuit 213, so as to perform the corresponding operation on the rewritable non-volatile memory module 220.

In this embodiment, the writing operation includes at least a host writing operation, a garbage collection writing operation, a wear-leveling writing operation, and so on. The host writing operation is an operation executed in order to execute a writing command that an operating system of the host system 10 gives to the processor 211, for example. That is, after the host writing operation is completed, the processor 211 responds to the host system with a writing completion message. The writing command is used to instruct the processor 211 to write a writing data to a logical address corresponding to the writing command. The garbage collection writing operation is a writing operation executed during execution of a garbage collection operation, for example. For example, it is assumed that the processor 211 executes the garbage collection operation on one physical unit. The processor 211 executes the garbage collection writing operation, so as to write all valid data of this physical unit to another physical unit. The wear-leveling writing operation is a writing operation executed during execution of a wear-leveling operation, for example.

In addition, the data to be written to the rewritable non-volatile memory module 220 is converted to a format acceptable to the rewritable non-volatile memory module 220 via the memory interface control circuit 213. More specifically, if the processor 211 is to access the rewritable non-volatile memory module 220, the processor 211 transmits the corresponding command sequence to the memory interface control circuit 213, so as to instruct the memory interface control circuit 213 to execute the corresponding operation. For example, the command sequences may include the writing command sequence for instructing to write data, the reading command sequence for instructing to read data, the erasing command sequence for instructing to erase data, and corresponding command sequences for instructing to execute various memory operations (e.g., change the level of a reading voltage or execute a garbage collection process). The command sequences may include one or more signals or data on the bus. The signals or data may include command codes or program codes. For example, the reading command sequence includes information, such as identification code and memory address, of the reading.

The rewritable non-volatile memory module 220 is coupled to the storage controller 210 (the memory interface control circuit 213) for storing data written by the host system 10. The rewritable non-volatile memory module 220 may be a Single Level Cell (SLC) NAND flash memory module (i.e., a flash memory module in which one memory cell stores 1 bit of data), a Multi Level Cell (MLC) NAND flash memory module (i.e., a flash memory module in which one memory cell stores 2 bits of data), a Triple Level Cell (TLC) NAND flash memory module (i.e., a flash memory module in which one memory cell stores 3 bits of data), a 3D NAND flash memory module, a vertical NAND flash memory module, other types of flash memory modules, or other memory modules having the same characteristics. The memory cells of the rewritable non-volatile memory module 220 are disposed in the form of an array.

In this embodiment, the memory cells of the rewritable non-volatile memory module 220 form a plurality of physical programming units (also referred to as physical sub units), and the physical programming units form a plurality of physical blocks (also referred to as physical erasing units or physical units). More specifically, the memory cells on the same word line (or on the same word line layer) form one or more physical programming units.

In this embodiment, the physical sub unit is the minimum unit for writing (programming) data. The physical unit is the minimum unit for erasing. That is, each physical unit has a minimum number of memory cells for being erased together. Each physical unit includes a plurality of physical sub units. The physical sub unit may be a physical page or a physical sector. In this embodiment, the physical sub unit includes a data bit region and a redundancy bit region. The data bit region is configured to store user data, and the redundancy bit region is configured to store the system data. The system data is an error correcting code, an error checking code, or meta data, for example. The meta data records the logical address of the user data stored by the corresponding physical page.

It should be noted that, in this embodiment, the processor 211 generates physical unit information (one kind of system data) according to current an erase count and a physical unit status of one physical unit to record information of the physical unit. The physical unit information may be stored to one or more physical sub units of the corresponding physical unit (e.g., stored in the data bit region or the redundancy bit region of the physical sub unit), or be recorded by using one or more physical sub units of the specific physical unit for recording all the system data in a system region.

In this embodiment, in order to record a timestamp (also referred to as global timestamp), the processor 211 records the timestamp (for example, generates and records the timestamp according to a current time) to the information according to different types of information and the corresponding conditions. The values of the timestamps (difference values) may indicate the sequence of the times of the corresponding information. Nevertheless, the invention is not intended to limit a specific format of the timestamp. For example, the processor 211 may distinguish the sequence of the times of two information according to the relative values of two timestamps respectively corresponding to the two information (the time of the information corresponding to the larger timestamp is later).

The host system 10 allocates a plurality of logical units to the rewritable non-volatile memory module 220 via the storage controller 210. The allocated logical units are used for accessing the user data stored in a plurality of physical units of the rewritable non-volatile memory module 220. Here, each logical unit may be composed of one or more logical addresses. For example, the logical unit may be a logical block, a logical page, or a logical sector. One logical unit may be mapped to one or more physical units, wherein the physical unit may be one or more physical addresses, one or more physical sectors, one or more physical programming units, or one or more physical erasing units.

In the following embodiments, for convenience of explanation, the physical unit refers to a physical block, the physical sub unit refers to a physical page, and the physical address refers to the corresponding physical page or the address thereof. However, in another embodiment, one physical unit/physical sub unit may be respectively composed of any number of memory cells, depending on the actual needs, and the physical address may refer to the address of the physical block or the physical page. In addition, the processor 211 establishes a plurality of index codes for a plurality of physical units, so that the index codes respectively correspond to the physical units, so as to identify the corresponding physical units according to the index codes.

Furthermore, the storage controller 210 creates a logical-to-physical table and a physical-to-logical table to record a mapping relationship between the logical units (e.g., logical block, logical page, logical address, or logical sector) and the physical units (e.g., physical erasing unit, physical programming unit, physical address, or physical sector) allocated to the rewritable non-volatile memory module 220. In other words, the storage controller 210 may find the physical unit to which one logical unit is mapped by the logical-to-physical table, and the storage controller 210 may find the logical unit to which one physical unit is mapped by the physical-to-logical table. In this embodiment, when the data writing operation for one logical page (logical address) is completed (e.g., the corresponding data has been programmed into one physical page), the processor 211 updates the logical-to-physical table correspondingly to record the address (physical address) of the physical page corresponding to the logical address. Nevertheless, the technical concept regarding the mapping between the logical units and physical units as described above is a common technique for those skilled in the art and thus is not repeated hereinafter.

In an embodiment, the storage controller 210 further includes a buffer memory and a power management circuit. The buffer memory (also referred to as memory) is coupled to the processor 211 and is configured to temporarily store data and commands from the host system 10, data from the rewritable non-volatile memory module 220, or other system data for managing the storage device 20 (e.g., logical-to-physical table, physical-to-logical table, main information table, sub information table, bad physical unit table, or wear-out physical unit table) for the processor 211 to quickly access the data, commands, or system data from the memory. The power management circuit is coupled to the processor 211 and configured to control a power of the storage device 20.

Figure 2:
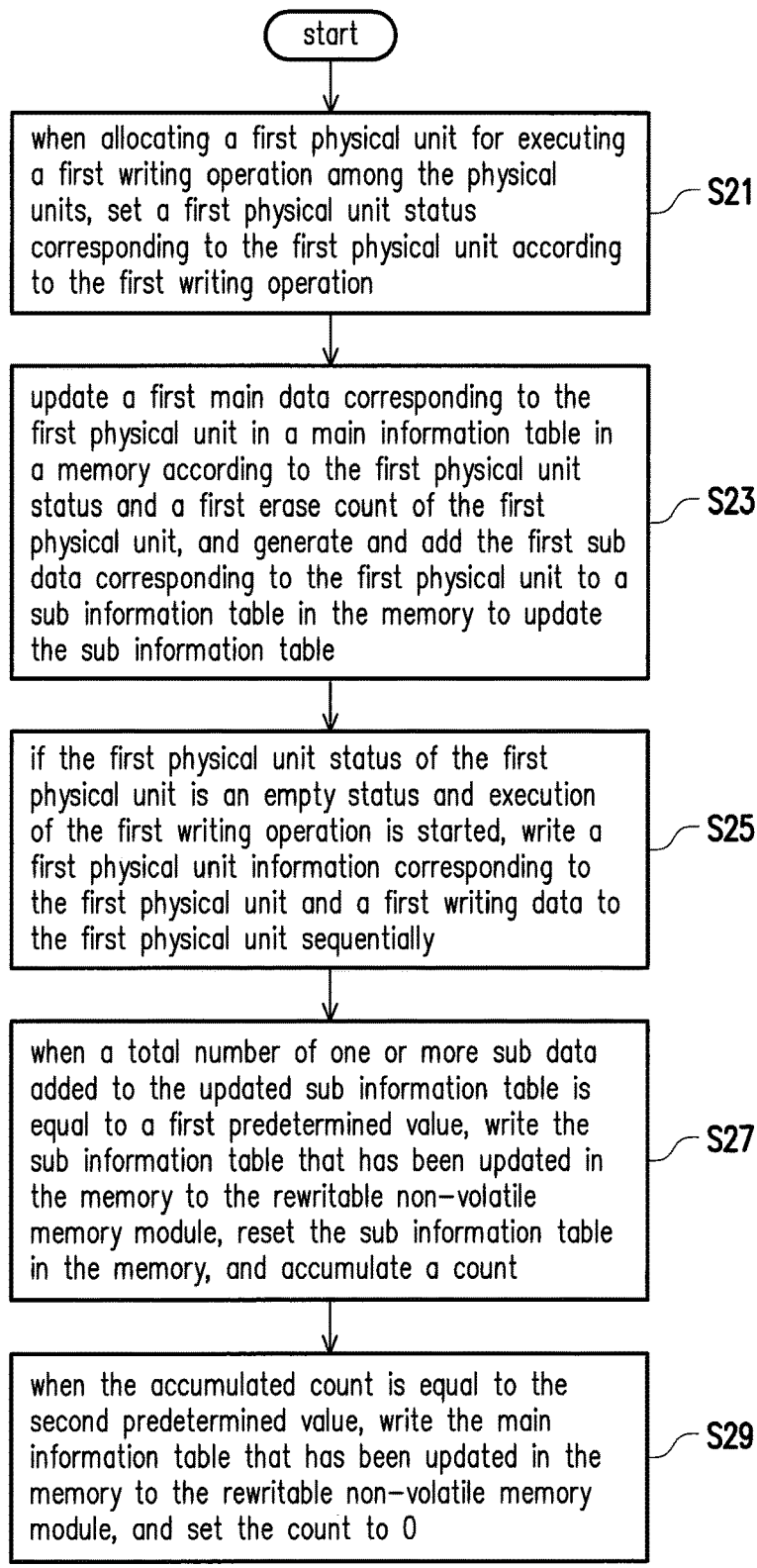
FIG. 2 is a flowchart of a data backup method according to an embodiment of the invention.

FIG. 2 is a flowchart of a data backup method according to an embodiment of the invention. Referring to FIG. 2, in Step S21, when a first physical unit for executing a first writing operation among the physical units is allocated, the processor 211 is configured to set a first physical unit status corresponding to the first physical unit according to the first writing operation. More specifically, before executing a writing operation (the first writing operation), the processor 211 selects (allocates) one physical unit (also referred to as the first physical unit) from the physical units, which are empty (or have been erased), of the rewritable non-volatile memory module 220, and then, when starting to execute the corresponding writing operation (the first writing operation), the processor 211 writes writing data corresponding to the first writing operation to the allocated first physical unit. After allocating the first physical unit, the processor 211 sets the first physical unit status corresponding to the first physical unit according to the type of the first writing operation.

In this embodiment, the type of the writing operation includes the "host writing operation," the "garbage collection writing operation," the "wear-leveling writing operation," and so on, as described above, for example. For example, it is assumed that the type of the first writing operation is the "host writing operation," and the processor 211 sets the first physical unit status of the first physical unit correspondingly to a "host writing status." To be more specific, at this time, the processor 211 changes the first physical unit status from the "empty status" (or "erased status") to the "host writing status."

In this embodiment, the size of the physical unit status is a byte, and the processor 211 uses different bit values to respectively record a plurality of physical unit statuses of one physical unit, wherein the physical unit statuses include "empty status," "erased status," "host writing status," "garbage collection writing status," "wear-leveling writing status," "bad status," and "wear-out status." The "empty status" indicates that currently the physical unit does not have any data written therein; the "erased status" indicates that the physical unit has been erased; the "host writing status" indicates that the physical unit is currently written with data according to the host writing operation; the "garbage collection writing status" indicates that currently the physical unit is written with data according to the garbage collection writing operation; the "wear-leveling writing status" indicates that currently the physical unit is written with data according to the wear-leveling writing operation; the "bad status" indicates that the physical unit is damaged and cannot be written; and the "wear-out status" indicates that the current wear-out level of the physical unit has exceeded a predetermined level.

After setting the first physical unit status, in Step S23, the processor 211 updates first main data corresponding to the first physical unit in the main information table in the memory according to the first physical unit status and a first erase count of the first physical unit, and generates and adds first sub data corresponding to the first physical unit to the sub information table in the memory to update the sub information table. Initialization of the main information table and the sub information table (initial main information table and sub information table) in the initialization/formatting procedure will be described first, and details of Step S23 are described thereafter.

In this embodiment, when the processor 211 executes the initialization/formatting procedure, the processor 211 generates and writes the initial main information table and the initial sub information table to the memory in the initialization/formatting procedure. Then, the processor 211 writes the initial main information table and the initial sub information table in the memory to rewritable non-volatile memory module 220, and resets the sub information table in the memory.

Figure 4A:
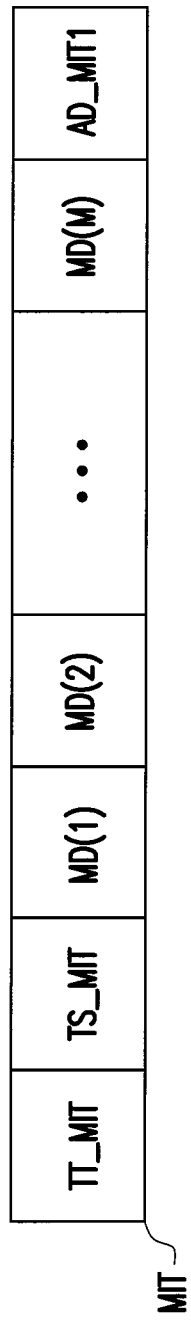
FIG. 4A is a schematic diagram showing the data structure of the main information table according to an embodiment of the invention.
Figure 4B:
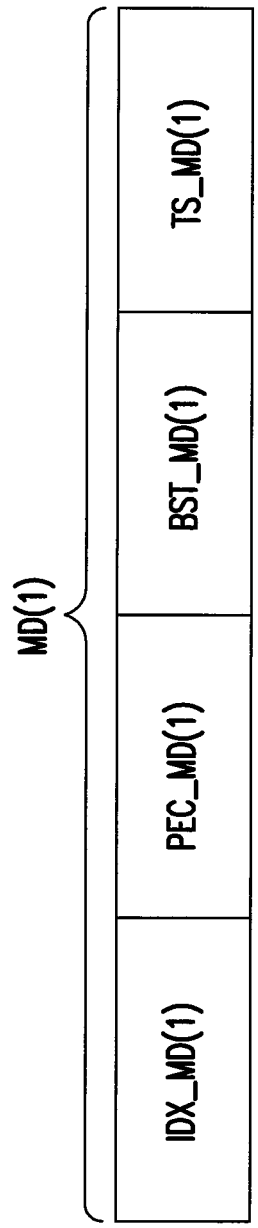
FIG. 4B is a schematic diagram showing the data structure of the main data in the main information table according to an embodiment of the invention.

FIG. 4A is a schematic diagram showing the data structure of the main information table according to an embodiment of the invention. FIG. 4B is a schematic diagram showing the data structure of the main data in the main information table according to an embodiment of the invention. Referring to FIG. 4A, for example, the initial main information table MIT in the memory includes a table type TT_MIT, a timestamp TS_MIT corresponding to the main information table MIT, and a plurality of main data MD(1) to MD(M). M is a positive integer and the value of M indicates the total number of all the physical units of the rewritable non-volatile memory module 220. When the processor 211 writes the initial main information table to the rewritable non-volatile memory module 220, the processor 211 first adds auxiliary data AD_MIT to the main information table MIT and then writes the main information table MIT. The auxiliary data AD_MIT is used to fill the total size of the main information table MIT to a main information table predetermined size. The auxiliary data AD_MIT may be an error checking code for protecting the main information table MIT or predetermined data having a fixed pattern.

The value recorded by the table type indicates the type of the data (table) that is currently accessed by the processor 211. The size of the table type is a byte. For example, if the value recorded by the table type is "0," it indicates that the current corresponding data is the main information table corresponding to all the physical units of the rewritable non-volatile memory module 220; and if the value recorded by the table type is "1," it indicates that the current corresponding data is the sub information table. According to the example described above, when the processor 211 reads the table type TT_MIT that records "0," the processor 211 determines that the data following the table type TT_MIT is the timestamp TS_MIT, the main data MD(1) to MD(M), and the auxiliary data AD_MIT corresponding to the main information table MIT. Nevertheless, the invention is not limited thereto, and the manufacturer may set the value recorded by the table type and its meaning according to the actual needs. The timestamp of the initial main information table MIT is a first initial value.

The main data MD(1) to MD(M) corresponds to all the physical units of the rewritable non-volatile memory module 220 respectively, and records a variety of information of the corresponding physical units. In this embodiment, the variety of information includes the index code, the erase count, and the physical unit status of the corresponding physical unit. Nevertheless, in another embodiment, the variety of information recorded by the main data further includes the timestamp of the corresponding physical unit.

Referring to FIG. 4B, for example, after setting the first physical unit status, the processor 211 updates the first main data MD(1) corresponding to the first physical unit in the main information table MIT in the memory according to the first physical unit status and the first erase count of the first physical unit. The processor 211 identifies the position of the first main data MD(1) in the main information table MIT according to the index code corresponding to the first physical unit. The processor 211 records the index code corresponding to the first physical unit as an index code IDX_MD(1) of the first main data MD(1); records the first erase count corresponding to the first physical unit as an erase count PEC_MD(1) of the first main data MD(1); and records the first physical unit status corresponding to the first physical unit as a physical unit status BST_MD(1) of the first main data MD(1). The first erase count corresponding to the first physical unit records the total number of times of erasing the first physical unit. That is, the first erase count is accumulated whenever the erasing operation on the first physical unit is completed.

In another embodiment, the processor 211 further records the timestamp corresponding to the first physical unit as the timestamp TS_MD(1) of the first main data MD(1).

In this embodiment, when the processor 211 has updated the first main data, the processor 211 updates the timestamp TS_MIT corresponding to the main information table MIT according to a current time (e.g., local time of the storage device) of updating the first main data MD(1). In other words, whenever one main data in the main information table is updated, the timestamp of the main information table is updated to the current time.

It should be noted that, in an embodiment, the variety of information recorded by the main data may not include the index code. In this embodiment, the positions of the main data MD(1) to MD(M) in the main information table are determined according to an arrangement order of the physical units, to which the main data MD(1) to MD(M) corresponds respectively, in the rewritable non-volatile memory module 220, and a plurality of index codes respectively corresponding to all the physical units of the rewritable non-volatile memory module 220 are for indicating the arrangement order of the corresponding physical units.

FIG. 5A is a schematic diagram showing the data structure of the initial sub information table according to an embodiment of the invention. FIG. 5B is a schematic diagram showing the data structure of the sub information table according to an embodiment of the invention. Referring to FIG. 5A, for example, the initial sub information table SIT1 in the memory includes a table type TT_SIT1, a timestamp TS_SIT1 corresponding to the sub information table SIT1, and an allocate array PA_SIT1. When the processor 211 writes the initial sub information table SIT1 to the rewritable non-volatile memory module 220, the processor 211 first adds auxiliary data AD_SIT1 to the sub information table SIT1 and then writes the initial sub information table SIT1. It should be noted that a sub data space SD1, which is for storing a plurality of sub data, in the initial sub information table SIT1 does not include any sub data. That is, the initial sub information table SIT1 written to the rewritable non-volatile memory module 220 only includes the table type TT_SIT1, the timestamp TS_SIT1 corresponding to the sub information table SIT1, and the auxiliary data AD_SIT1.

The definition of the table type TT_SIT1 is similar to that of the table type TT_MIT. For example, when the processor 211 reads the table type TT_SIT1 that records "1," the processor 211 determines that the data following the table type TT_SIT1 is the timestamp TS_SIT1, the (initial) allocate array PA_SIT1, and the auxiliary data AD_SIT1 corresponding to the initial sub information table SIT1. The timestamp TS_SIT1 of the initial sub information table SIT1 is a second initial value. The (initial) allocate array PA_SIT1 may be preset.

Figure 5C:
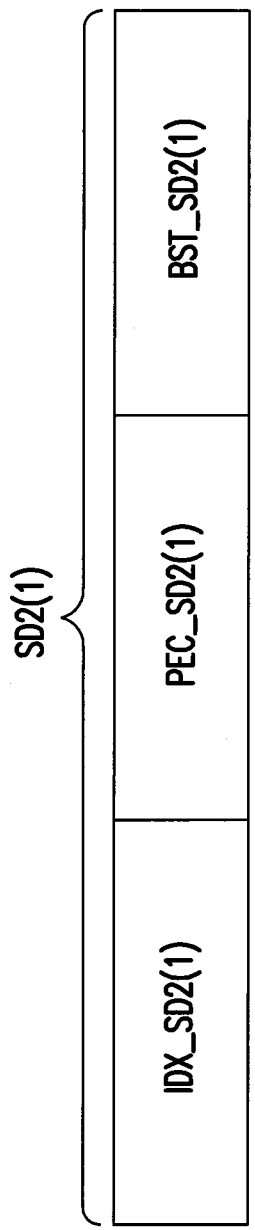
FIG. 5C is a schematic diagram showing the data structure of the sub data in the sub information table according to an embodiment of the invention.
Figure 5D:
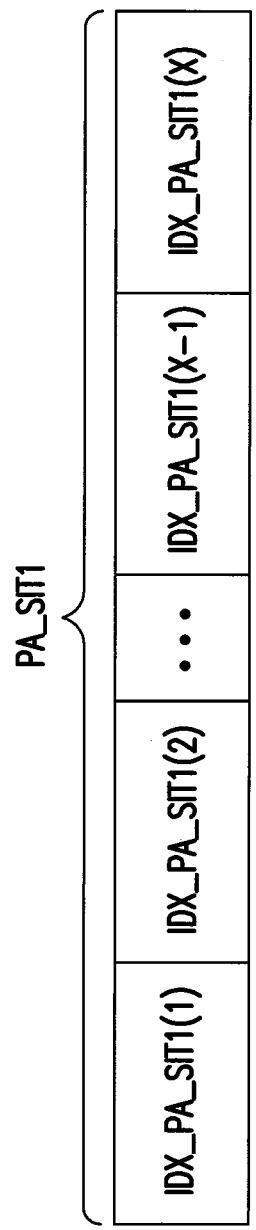
FIG. 5D is a schematic diagram showing the data structure of the allocate array in the sub information table according to an embodiment of the invention.

FIG. 5D is a schematic diagram showing the data structure of the allocate array in the sub information table according to an embodiment of the invention. Referring to FIG. 5D, the allocate array PA_SIT1 records a plurality of index codes IDX_PA_SIT1(1) to IDX_PA_SIT1(X). X is a preset positive integer (the total number of the index codes of the allocate array is equal to X). The manufacturer may set the value of X according to the actual needs. X may be adjusted dynamically according to the degree of aging of the storage device. The index codes IDX_PA_SIT1(1) to IDX_PA_SIT1(X) respectively correspond to a plurality of physical units (also referred to as second physical units). The second physical units have not been written with any data (i.e., empty physical units), and the physical unit status of the second physical units is "empty status" and "erased status." It should be noted that, in this embodiment, the allocate array is an array of 1*X. Nevertheless, in other embodiments, the allocate array may be an array of n*X. n is a positive integer.

When the processor 211 writes the initial sub information table SIT1 to the rewritable non-volatile memory module 220, the processor 211 first adds the auxiliary data AD_SIT1 to the sub information table SIT1 and then writes the sub information table SIT1. The auxiliary data AD_SIT1 is used to fill the total size of the sub information table SIT1 to a sub information table predetermined size. The auxiliary data AD_SIT1 may be an error checking code for protecting the sub information table SIT1 or predetermined data having a fixed pattern.

In this embodiment, the processor 211 generates a current allocate array according to the index codes of the allocate array of the newest sub information table stored in the rewritable non-volatile memory module. In other words, it is assumed that the newest sub information table currently stored in the rewritable non-volatile memory module is the initial sub information table SIT1, and the processor 211 generates the current allocate array according to the allocate array PA_SIT1 of the sub information table SIT1. The current allocate array records the index codes IDX_PA_SIT1(1) to IDX_PA_SIT1(X) recorded by the allocate array PA_SIT1. Then, when the processor 211 is to execute a writing operation, the processor 211 selects the physical unit for executing the writing operation according to the generated current allocate array. To be more specific, if the processor 211 is to execute a writing operation (before executing the writing operation), the processor 211 identifies one or more first index codes that have not been selected among the index codes of the generated current allocate array. Thereafter, the processor 211 selects a second index code that is arranged most front among the one or more first index codes, and identifies the physical unit corresponding to the second index code according to the selected second index code. At last, the processor 211 allocates the identified physical unit to execute the writing operation, i.e., programming the writing data corresponding to the writing operation to the physical unit (corresponding to the second index code). In other words, the index codes that have been selected in the current allocate array are not selected again, such that the processor 211 does not select and allocate the physical units that have been allocated.

In this embodiment, whenever the processor 211 writes the sub information table in the memory to rewritable non-volatile memory module 220, the processor 211 resets the sub information table in the memory. For example, after the processor 211 writes the initial sub information table SIT1 to the rewritable non-volatile memory module 220, the processor 211 resets the sub information table SIT1 as a sub information table SIT2. More specifically, the processor 211 clears a sub data section SD1 of the sub information table SIT1 in the memory (delete all the sub data therein), and updates the allocate array PA1 of the sub information table SIT1 in the memory. In an embodiment, in the process of resetting the initial sub information table SIT1 as the sub information table SIT2, the processor 211 changes the table type TT_SIT1 with the bit value "1" to a table type TT_SIT2 with the bit value "2." Accordingly, the processor 211 is enabled to identify that the sub information table SIT2 currently maintained in the memory is not the initial sub information table SIT1. That is, a sub information section SD2 of the sub information table SIT2 may have (be added with) sub data.

In this embodiment, in the process of resetting the initial sub information table SIT1 as the sub information table SIT2, the processor 211 may change the timestamp TT_SIT1 to a timestamp TT_SIT2, wherein the timestamp TT_SIT2 records the current time of resetting the sub information table. In another embodiment, in the process of resetting the initial sub information table SIT1 as the sub information table SIT2, the processor 211 may not change the timestamp TT_SIT2.

In addition, in the process of resetting the sub information table, the processor 211 also resets the allocate array. For example, in the process that the processor 211 resets the sub information table SIT1 as the sub information table SIT2, the processor 211 selects other physical units (the number thereof is X), which are not the physical units to which the index codes of the allocate array PA_SIT1 correspond, from all the empty (erased) physical units in the rewritable non-volatile memory module 220, and records the index codes respectively corresponding to the other physical units to an allocate array PA_SIT2 of the sub information table SIT2.

It should be noted that, in an embodiment, a time point of generating the (new) current allocate array may be in the period when the sub information table starts to be written to the rewritable non-volatile memory module 220. In another embodiment, if the processor 211 determines that all the index codes in the old current allocate array have been selected, the processor 211 generates a new current allocate array according to the allocate array of the sub information table currently in the memory.

That is, the allocate array of the sub information table in the memory is used for the processor 211 to generate a new current allocate array according to the allocate array, so as to identify the next group of physical units available to be allocated. In other words, it may be deemed that the processor 211 maintains in the memory the current allocate array, which is for identifying the physical units currently available to be allocated, and the allocate array, which is for identifying the physical units that will be available to be allocated in the future (in the sub information table).

It is assumed that the processor 211 has completed resetting the sub information table. The sub information table SIT2 that has been reset and maintained in the memory includes the table type TT_SIT2, the timestamp TS_SIT2, the allocate array PA_SIT2, and the sub data section SD2, wherein the sub data section SD2 does not include any sub data. Referring to FIG. 2 again, in Step S23, in addition to updating the main information table as described above, the processor 211 generates and adds the first sub data corresponding to the first physical unit to the sub information table in the memory to update the sub information table.

FIG. 5C is a schematic diagram showing the data structure of the sub data in the sub information table according to an embodiment of the invention. Referring to FIG. 5C, for example, it is assumed that the sub information table currently in the memory is the sub information table SIT2 that has been reset. After setting the first physical unit status, the processor 211 generates sub data SD2(1) (also referred to as first sub data) according to the first physical unit status and the first erase count of the first physical unit.

In this embodiment, the generated sub data records a variety of information corresponding to the physical unit. The variety of information includes the index code, the erase count, and the physical unit status of the corresponding physical unit. Nevertheless, in another embodiment, the variety of information recorded by the sub data further includes the timestamp of the corresponding physical unit.

That is, in the above example, the processor 211 records the index code corresponding to the first physical unit as an index code IDX_SD2(1) of the first sub data SD2(1); records the first erase count corresponding to the first physical unit as an erase count PEC_SD2(1) of the first sub data SD2(1); and records the first physical unit status corresponding to the first physical unit as a physical unit status BST_SD2(1) of the first sub data SD2(1). Accordingly, the processor 211 completes generation of the first sub data SD2(1). Then, the processor 211 stores the generated first sub data SD2(1) in the available space of the sub data section SD2 from the beginning. For example, if the processor 211 is to execute another writing operation, the processor 211 may generate the corresponding sub data SD2(2) and store the sub data SD2(2) after the sub data SD2(1). Likewise, the processor 211 generates and stores corresponding sub data (e.g., sub data SD(2) to SD(X)) to the sub data section SD2 sequentially according to other writing operations.

In this embodiment, when the processor 211 has added the first sub data SD2(1) described above, the processor 211 updates the timestamp TS_SIT2 corresponding to the sub information table SIT2 according to the current time of adding the first sub data SD2(1). In other words, whenever one sub data is added to the sub information table, the timestamp of the sub information table is updated to the current time. Accordingly, the processor 211 updates the sub information table according to the first writing operation.

Since the first physical unit for executing the first writing operation has been allocated, the corresponding first physical unit status has been set, and the main information table and the sub information table have been updated, the processor 211 starts to execute the first writing operation.

Referring to FIG. 2 again, then, in Step S25, if the first physical unit status of the first physical unit is the empty status and execution of the first writing operation is started (starting to execute the first writing operation to write/program first data into the first physical unit), the first physical unit information corresponding to the first physical unit and the first writing data are sequentially written to the first physical unit.

Figure 6A:
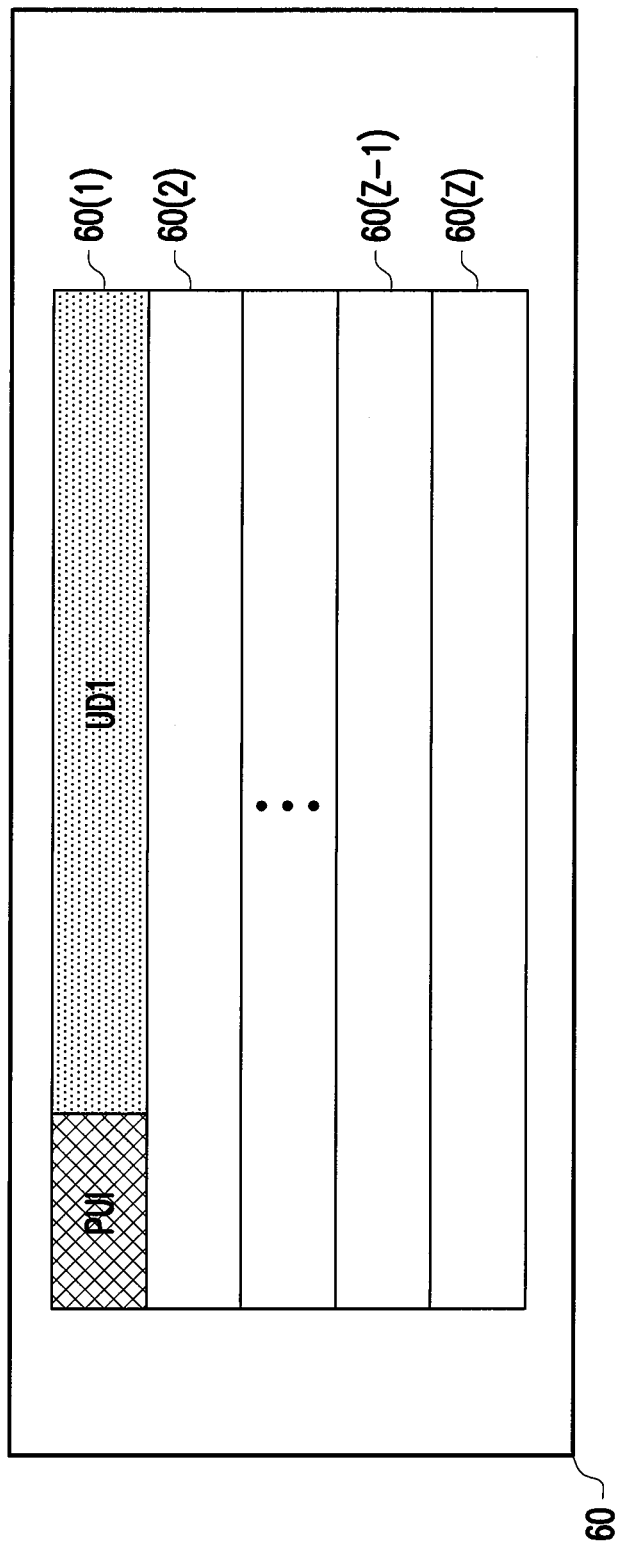
FIG. 6A is a schematic diagram showing the storage position of the physical unit information according to an embodiment of the invention.
Figure 6B:
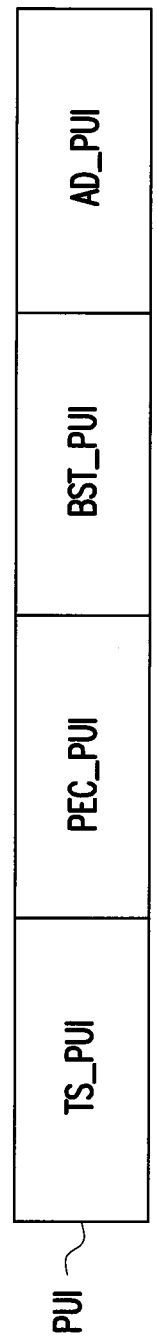
FIG. 6B is a schematic diagram showing the data structure of the physical unit information according to an embodiment of the invention.

FIG. 6A is a schematic diagram showing a storage position of the physical unit information according to an embodiment of the invention. FIG. 6B is a schematic diagram showing the data structure of the physical unit information according to an embodiment of the invention. Referring to FIG. 6A, for example, it is assumed that a first physical unit 60 includes a plurality of physical pages 60(1) to 60(Z). The first physical unit that has just been allocated is in the empty status (the physical pages 60(1) to 60(Z) are all empty), and the processor 211 starts to execute the first writing operation to write writing data UD1 to the first physical unit. At this time, the processor 211 determines that the first physical unit is in the empty status (e.g., the first physical page 60(1) is empty), and the processor 211 generates first physical unit information PUI corresponding to the first physical unit, writes the generated first physical unit information PUI (the diamond grid part in FIG. 6A, for example) to the physical page 60(1) first, and then, following the first physical unit information PUI that has been written, writes the writing data UD1 (the dots pattern part in FIG. 6A, for example) to the physical page 60(1). That is, the data, which is stored in one physical unit and arranged before the first of writing data that has been stored to the physical unit, is the physical unit information corresponding to the physical unit.

Referring to FIG. 6B, in this embodiment, in the process of generating the first physical unit information according to the first writing operation, the processor 211 records the timestamp TS_PUI of the first physical unit information PUI according to the current time of starting executing the first writing operation; records the first erase count corresponding to the first physical unit 60 as the erase count PEC PUI of the first physical unit information PUI; records the first physical unit status corresponding to the first physical unit as the physical unit status BST PUI of the first physical unit information PUI; and adds auxiliary data AD PUI to the rear end of the first physical unit information PUI. The auxiliary data AD PUI is used to fill the total size of the first physical unit information PUI to a physical unit information predetermined size. The auxiliary data AD PUI may be an error checking code for protecting the first physical unit information PUI or predetermined data having a fixed pattern.

In Step S27, when a total number of one or more sub data added to the updated sub information table is equal to a first predetermined value, the sub information table that has been updated in the memory is written to the rewritable non-volatile memory module, the sub information table in the memory is reset, and a count is accumulated.

For example, it is assumed that the processor 211 generates the sub data SD2(X) according to the first physical unit status and the first erase count of the first physical unit, so as to update the sub information table SIT2. The first predetermined value is X. The timestamp TS_SIT2 is updated correspondingly. The total number of the sub data SD2(1) to SD(X) in the sub data section SD2 of the sub information table SIT2 is X. Thus, the processor 211 writes the sub information table SIT2 to the rewritable non-volatile memory module 220. That is, in this embodiment, the processor 211 determines whether to write one sub information table to the rewritable non-volatile memory module 220 according to the total number of the sub data of the sub information table. Nevertheless, the invention is not limited thereto. The processor 211 may also determine whether to write the sub information table by other methods. For example, in another embodiment, the processor 211 may determine whether to write the sub information table by determining whether the sub data section of the sub information table is full. For example, in yet another embodiment, the processor 211 may accumulate another count whenever one sub data is added to one sub information table (this another count is for recording the number of the sub data that has been added to the sub information table), and determine whether to write the sub information table by determining whether the another count has reached a threshold value.

Thereafter, as described above, after writing one sub information table maintained in the memory, the processor 211 resets the sub information table in the memory. Furthermore, the processor 211 accumulates a count. The count is for recording the number of times of writing the sub information table to the rewritable non-volatile memory module 220. From another aspect, a product obtained by multiplying the count by the first predetermined value indicates the total number of the physical units that have been allocated for executing the writing operations in a period. In other words, the value of the product may indicate the number of times of updating the main information table in the memory.

In Step S29, when the accumulated count is equal to a second predetermined value, the main information table that has been updated in the memory is written to the rewritable non-volatile memory module, and the count is set to 0.

More specifically, in this embodiment, the processor 211 determines whether to write the main information table to the rewritable non-volatile memory module 220 according to the total number of times of updating the main information table in the memory. To be more specific, the processor 211 may set a main information table update threshold value, and the processor 211 determines whether to write the main information table to the rewritable non-volatile memory module 220 by determining whether the total number of times of updating the main information table in the memory has reached the main information table update threshold value. Moreover, the processor 211 divides the main information table update threshold value by the first predetermined value to obtain the second predetermined value.

That is, whenever the count is accumulated, the processor 211 determines whether the accumulated count is equal to the second predetermined value. When the accumulated count is equal to the second predetermined value, since the product obtained by multiplying the count by the first predetermined value (i.e., the total number of times of updating the main information table in the memory) is equal to the main information table update threshold value, the processor 211 writes the main information table to the rewritable non-volatile memory module 220. In addition, the processor 211 sets the count to 0, so as to recalculate the total number of times of updating the main information table in the memory.

In this embodiment, the main information table, the sub information table, and the physical unit information that are stored to the rewritable non-volatile memory module 220 according to different conditions as described above may be used for recovering the newest main information table in the memory when a specific event occurs. For example, the specific event may be a sudden power failure event, a memory failure, and so on that causes the main information table and the sub information table in the memory to disappear. A data recovery method of the invention is described in detail hereinafter with reference to FIG. 3.

Figure 3:
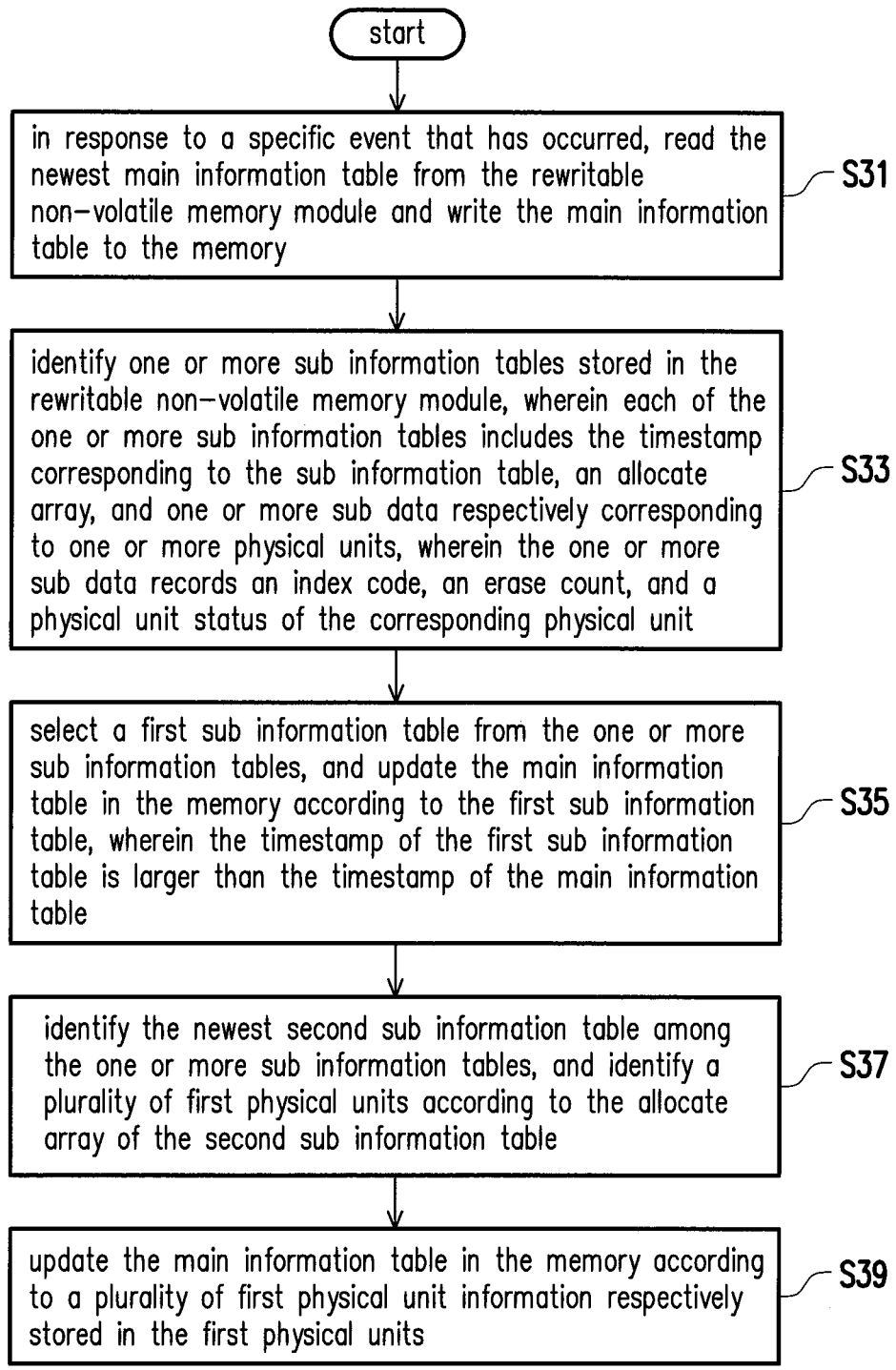
FIG. 3 is a flowchart of a data recovery method according to an embodiment of the invention.

FIG. 3 is a flowchart of the data recovery method according to an embodiment of the invention. Referring to FIG. 3, in Step S31, in response to the specific event that has occurred, the processor 211 reads the newest main information table from the rewritable non-volatile memory module 220 and writes the main information table to the memory.

For example, it is assumed that the specific event is the sudden power failure event. When the sudden power failure event occurs, the main information table and the sub information table maintained in the memory both disappear due to the sudden power failure. After the storage device 20 is powered on, the processor 211 determines that the storage device 20 had the specific event, and starts to execute a data recovery operation. First, the processor 211 searches for the newest main information table in the rewritable non-volatile memory module 220. For example, the processor 211 may identify a plurality of main information tables in the rewritable non-volatile memory module 220 according to the table type (e.g., the table type having the bit value "0"). Then, the processor 211 identifies the newest main information table (with the largest timestamp among the timestamps of the main information tables) according to the timestamps of the main information tables, and the processor 211 reads the newest main information table and stores (writes) the newest main information table to the memory, so as to update the main information table stored in the memory in the subsequent steps.

In Step S33, the processor 211 identifies one or more sub information tables stored in the rewritable non-volatile memory module, wherein each of the one or more sub information tables includes the timestamp corresponding to the sub information table, the allocate array, and one or more sub data respectively corresponding to one or more physical units, wherein the one or more sub data records the index code, the erase count, and the physical unit status of the corresponding physical unit. More specifically, the processor 211 may identify a plurality of sub information tables in the rewritable non-volatile memory module 220 according to the table type (e.g., the table type having the bit value "1" or "2"). The data structure of the sub information table has been described above and thus is not repeated hereinafter.

In order to search for the one or more sub information tables that are stored into the non-volatile memory module 220 after storing the newest main information table into non-volatile memory module 220, next, in Step S35, the processor 211 selects a first sub information table from the one or more sub information tables, and updates the main information table in the memory according to the first sub information table, wherein the timestamp of the first sub information table is larger than the timestamp of the main information table. That is, the time that the first sub information table is stored to the rewritable non-volatile memory module 220 is later than the time that the main information table is stored to the rewritable non-volatile memory module 220.

Then, the processor 211 selects one sub information table (also referred to as first sub information table) from the one or more sub information tables for updating the main information table. To be more specific, the processor 211 identifies a plurality of physical units (also referred to as second physical units) respectively corresponding to the first sub data from the physical units according to a plurality of index codes recorded by the first sub data of the first sub information table. That is, as described above, the index code recorded by each first sub data corresponds to one physical unit, and the erase count and the physical unit status of this physical unit are recorded by the corresponding first sub data.

Accordingly, the processor 211 may update the erase counts recorded by a plurality of second main data respectively corresponding to the second physical units in the main information table in the memory according to a plurality of second erase counts recorded by the first sub data respectively corresponding to the second physical units. That is, the processor 211 may update the erase counts (which are recorded in the second main data, which is corresponding to the second physical units) corresponding to the second physical units, of the main information table in the memory according to a plurality of erase counts, which is corresponding to the second physical units, recorded by the sub information table that is stored at a later time.

Likewise, the processor 211 may update the physical unit statuses recorded by the second main data according to a plurality of second physical unit statuses recorded by the first sub data.

After all the sub information tables that are stored at a time later than the main information table are selected and used for updating the main information table, Step S35 is completed. However, in order to recover the sub information tables that may exist (in the memory before the event) and are not yet stored to the rewritable non-volatile memory module 220, the processor 211 proceeds to Step S37 to obtain information (e.g., the erase count and the physical unit status corresponding to the physical unit) of the physical unit corresponding to the sub data recorded by the sub information table by using the physical unit information stored in the physical unit, so as to further update the main information table.

In Step S37, the processor 211 identifies the newest second sub information table among the one or more sub information tables, and identifies a plurality of first physical units according to the allocate array of the second sub information table. More specifically, the allocate array of the newest sub information table stored in the rewritable non-volatile memory module 220 records a plurality of index codes of the current allocate array used by the processor 211 at the time that the specific event occurs. The index codes respectively correspond to a plurality of physical units (also referred to as first physical units). In other words, when the specific event occurs, one or more physical units of the first physical units may have been allocated and written with the corresponding physical unit information. However, the information (e.g., the erase count and the physical unit status) recorded by the physical unit information is not recorded in the sub information table and the main information table maintained in the memory at that time.

Thus, after identifying the first physical units, in Step S39, the processor 211 updates the main information table in the memory according to a plurality of first physical unit information respectively stored in the first physical units. More specifically, for each of the first physical units, the processor 211 searches to determine whether the physical unit information (also referred to as first physical unit information) has been stored. Then, the processor 211 updates the erase counts recorded by a plurality of first main data respectively corresponding to the first physical units in the main information table in the memory according to a plurality of first erase counts recorded by the first physical unit information respectively corresponding to the first physical units; and updates the physical unit statuses recorded by the first main data according to a plurality of first physical unit statuses respectively recorded by the first physical unit information.

In other words, if one first physical unit stores the first physical unit information, the processor 211 positions the first main data corresponding to the first physical unit in the main information table according to the first physical unit, and updates the timestamp, the erase count, and the physical unit status of the first main data by using the timestamp, the erase count, and the physical unit status of the first physical unit information.

It should be noted that, in another embodiment, the processor 211 may directly search among the physical unit information recorded by the rewritable non-volatile memory module 220 for one or more physical unit information with a timestamp larger than the timestamp of the newest sub information table according to the timestamp to serve as the first physical unit information. That is, in another embodiment, the sub information table stored to the rewritable non-volatile memory module 220 does not need to record the allocate array.

When the processor 211 has completed Step S39 and the main information table in the memory has been updated according to all the first physical unit information, the processor 211 completes the data recovery operation.

To sum up, in the data backup method, the data recovery method, and the storage controller provided in the embodiments of the invention, when one physical unit is written for the first time, the corresponding physical unit information is recorded to the physical unit, and the physical unit status and the erase count corresponding to the physical unit in the changed status are recorded to the sub information table; and when a certain number of sub information tables are written to the rewritable non-volatile memory module, the main information table for recording main data of all the physical units of the rewritable non-volatile memory module is written to the rewritable non-volatile memory module, so as to record the physical units having changed statuses separately. Accordingly, the system is able to record/back up the physical unit statuses that have been changed with use of fewer resources, improve the smoothness of the writing operation and the service life of the rewritable non-volatile memory module, and thereby increase the working efficiency. In addition, in the data backup method, the data recovery method, and the storage controller provided in the embodiments of the invention, different types of physical unit information, sub information tables, and main information tables are stored at different time points, such that when the data backup method is performed with use of less resources, the main information table and the physical unit status information corresponding to all the physical units of the rewritable non-volatile memory module therein may be recovered efficiently and safely.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A data backup method adapted for a storage device comprising a rewritable non-volatile memory module, wherein the rewritable non-volatile memory module comprises a plurality of physical units, the data backup method comprising:

when allocating a first physical unit for executing a first writing operation among the physical units, setting a first physical unit status corresponding to the first physical unit according to the first writing operation;

updating first main data corresponding to the first physical unit in a main information table in a memory according to the first physical unit status and a first erase count of the first physical unit, and generating and adding first sub data corresponding to the first physical unit to a sub information table in the memory to update the sub information table, wherein the sub information table comprises a timestamp corresponding to the sub information table, an allocate array, and one or more sub data respectively corresponding to one or more physical units, wherein the one or more sub data records an index code, an erase count, and a physical unit status of the corresponding physical unit;

if the first physical unit status of the first physical unit is an empty status and execution of the first writing operation is started, sequentially writing first physical unit information corresponding to the first physical unit and first writing data to the first physical unit;

when a total number of the one or more sub data added to the sub information table that has been updated is equal to a first predetermined value, writing the sub information table that has been updated in the memory to the rewritable non-volatile memory module, resetting the sub information table in the memory, and accumulating a count;

when the count that has been accumulated is equal to a second predetermined value, writing the main information table that has been updated in the memory to the rewritable non-volatile memory module and setting the count to 0;

generating and writing the main information table that is initial and the sub information table that is initial to the memory in an initialization procedure of the storage device; and writing the main information table that is initial and the sub information table that is initial in the memory to the rewritable non-volatile memory module, and resetting the sub information table in the memory, wherein the sub information table that is initial does not comprise any sub data, wherein the main information table in the memory comprises a timestamp corresponding to the main information table, wherein the timestamp of the main information table that is initial is a first initial timestamp, and the timestamp of the sub information table that is initial is a second initial timestamp.

2. The data backup method according to claim 1,
wherein the main information table in the memory further comprises a plurality of main data respectively corresponding to the physical units, wherein each of the plurality of main data records the erase count and the physical unit status of the corresponding physical unit, wherein the first physical unit information records a timestamp corresponding to the first physical unit information, the first erase count, and the first physical unit status.

3. The data backup method according to claim 2, further comprising:

updating the timestamp corresponding to the main information table according to a current time of updating the first main data corresponding to the first physical unit in the main information table in the memory;

updating the timestamp corresponding to the sub information table according to a current e of adding the first sub data corresponding to the first physical unit to the sub information table in the memory; and recording the timestamp corresponding to the first physical unit information according to a current time of starting the execution of the first writing operation.

4. The data backup method according to claim 2, wherein the allocate array of the sub information table records a plurality of index codes respectively corresponding to a plurality of second physical units of the physical units, wherein a total number of the index codes is the first predetermined value, and the data backup method further comprises:

generating a current allocate array according to a plurality of index codes of an allocate array of a newest sub information table stored in the rewritable non-volatile memory module, wherein allocating the first physical unit for executing the first writing operation among the physical units comprises:

identifying one or more first index codes that have not been selected among the index codes of the current allocate array before executing the first writing operation;

selecting a second index code that is arranged most front among the one or more first index codes; and identifying the first physical unit corresponding to the second index code according to the second index code that is selected, and allocating the first physical unit to execute the first writing operation.

5. The data backup method according to claim 1, wherein the step of resetting the sub information table in the memory comprises:

clearing all the sub data in the sub information table;

selecting a plurality of third physical units that are empty from the physical units, wherein a total number of the third physical units is the first predetermined value; and replacing all the index codes of the allocate array of the sub information table with a plurality of third index codes respectively corresponding to the third physical units.

6. A storage controller adapted to control a storage device comprising a rewritable non-volatile memory module, the storage controller comprising:

a memory interface control circuit coupled to the rewritable non-volatile memory module, wherein the rewritable non-volatile memory module comprises a plurality of physical units; and a processor coupled to the memory interface control circuit and a memory, wherein when allocating a first physical unit for executing a first writing operation among the physical units, the processor is configured to set a first physical unit status corresponding to the first physical unit according to the first writing operation, wherein the processor is further configured to update first main data corresponding to the first physical unit in a main information table in the memory according to the first physical unit status and a first erase count of the first physical unit, and generate and add first sub data corresponding to the first physical unit to a sub information table in the memory to update the sub information table, wherein the sub information table comprises a timestamp corresponding to the sub information table, an allocate array, and one or more sub data respectively corresponding to one or more physical units, wherein the one or more sub data records an index code, an erase count, and a physical unit status of the corresponding physical unit, wherein if the first physical unit status of the first physical unit is an empty status and execution of the first writing operation is started, the processor is further configured to sequentially write first physical unit information corresponding to the first physical unit and first writing data to the first physical unit, wherein when a total number of the one or more sub data added to the sub information table that has been updated is equal to a first predetermined value, the processor is further configured to write the sub information table that has been updated in the memory to the rewritable non-volatile memory module, reset the sub information table in the memory, and accumulate a count, wherein when the count that has been accumulated is equal to a second predetermined value, the processor is further configured to write the main information table that has been updated in the memory to the rewritable non-volatile memory module and set the count to 0, wherein the processor generates and writes the main information table that is initial and the sub information table that is initial to the memory in an initialization procedure of the storage device, wherein the processor writes the main information table that is initial and the sub information table that is initial in the memory to the rewritable non-volatile memory module, and resets the sub information table in the memory, wherein the sub information table that is initial does not comprise any sub data, wherein the main information table in the memory comprises a timestamp corresponding to the main information table wherein the timestamp of the main information table that is initial is a first initial timestamp, and the timestamp of the sub information table that is initial is a second initial timestamp.

7. The storage controller according to claim 6,
wherein the main information table in the memory further comprises a plurality of main data respectively corresponding to the physical units, wherein each of the plurality of main data records the erase count and the physical unit status of the corresponding physical unit,
wherein the first physical unit information records a timestamp corresponding to the first physical unit information, the first erase count, and the first physical unit status.

8. The storage controller according to claim 7,
wherein the processor updates the timestamp corresponding to the main information table according to a current time of updating the first main data corresponding to the first physical unit in the main information table in the memory,
wherein the processor updates the timestamp corresponding to the sub information table according to a current time of adding the first sub data corresponding to the first physical unit to the sub information table in the memory,
wherein the processor records the timestamp corresponding to the first physical unit information according to a current time of starting the execution of the first writing operation.

9. The storage controller according to claim 7, wherein the allocate array of the sub information table records a plurality of index codes respectively corresponding to a plurality of second physical units of the physical units, wherein a total number of the index codes is the first predetermined value,
wherein the processor generates a current allocate array according to a plurality of index codes of an allocate array of a newest sub information table stored in the rewritable non-volatile memory module,
wherein when allocating the first physical unit for executing the first writing operation among the physical units,
the processor identifies one or more first index codes that have not been selected among the index codes of the current allocate array before executing the first writing operation,
wherein the processor selects a second index code that is arranged most front among the one or more first index codes,
wherein the processor identifies the first physical unit corresponding to the second index code according to the second index code that is selected, and allocates the first physical unit to execute the first writing operation.

10. The storage controller according to claim 6, wherein in the operation of resetting the sub information table in the memory,
the processor clears all the sub data in the sub information table,
wherein the processor selects a plurality of third physical units that are empty from the physical units, wherein a total number of the third physical units is the first predetermined value,
wherein the processor replaces all the index codes of the allocate array of the sub information table with a plurality of third index codes respectively corresponding to the third physical units.

* * * * *